April 7, 1936.   J. MIHALYI   2,036,428
OPTICAL SYSTEM FOR PHOTOGRAPHIC APPARATUS
Filed June 24, 1933   2 Sheets-Sheet 1

Inventor:
Joseph Mihalyi,
By
Newton M. Pierce
Donald H. Stewart.
Attorneys.

April 7, 1936.   J. MIHALYI   2,036,428
OPTICAL SYSTEM FOR PHOTOGRAPHIC APPARATUS
Filed June 24, 1933   2 Sheets-Sheet 2
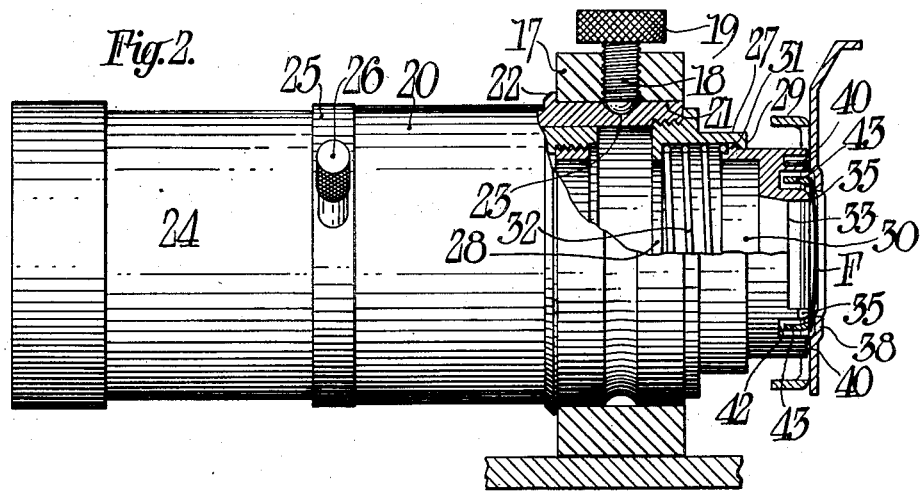
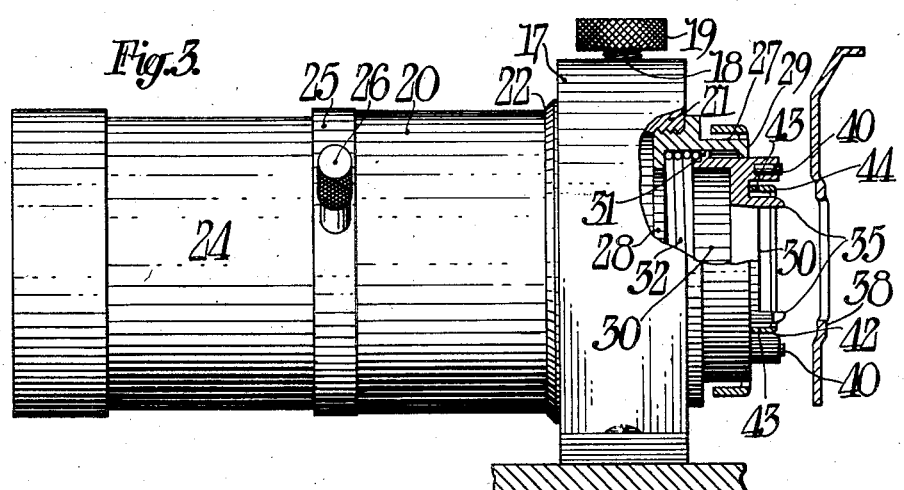
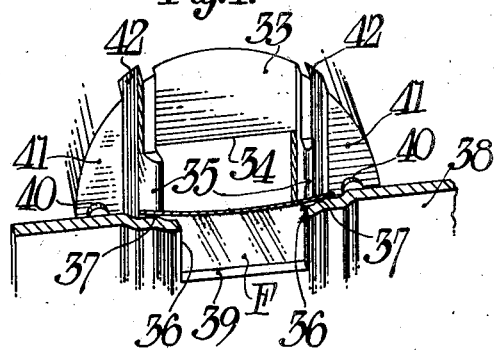
Inventor:
Joseph Mihalyi, Patented Apr. 7, 1936

2,036,428

UNITED STATES PATENT OFFICE 2,036,428

OPTICAL SYSTEM FOR PHOTOGRAPHIC APPARATUS

Joseph Mihalyi, Rochester, N. Y., assignor to Eastman Kodak Company, Rochester, N. Y., a corporation of New York Application June 24, 1933, Serial No. 677,423

5 Claims. (Cl. 88—17)

This invention relates to photography and more particularly to an optical system for a motion picture apparatus, particularly for motion picture projection apparatus. One object of my invention is to provide an optical system and suitable structure to use with it to permit wide aperture lenses to be used without having such lenses fully corrected. Another object of my invention is to provide a unitary structure which may be placed on standard motion picture apparatus so that a wide aperture objective may be substituted for the usual objective used with the apparatus. Another object of my invention is to provide a unitary structure which is adapted to move film in a motion picture apparatus out of a plane surface, so that the surface of the film will correspond with the field of the objective. Another object of my invention is to provide an interchangeable lens mount for motion picture apparatus in which a supplementary guide means is carried by the objective and is adapted to co-operate with a stationary gate element carried by the motion picture apparatus. Another object of my invention is to provide an objective with a supplementary guide means adapted to curve a film, this supplementary guide means being carried by the objective and being so shaped as to curve a film in accordance with the curvature of the field of the objective by which it is carried. Still another object of my invention is to provide a removable lens mount for motion picture apparatus carrying an objective and a supplementary guide means adapted to position film in the focus of the objective, the supplementary guide means being resiliently carried by and being removable with the removable objective, and other objects will appear from the following specification, the novel features being particularly pointed out in the claims at the end thereof.

Coming now to the drawings wherein like reference characters denote like parts throughout:

Fig. 2 is an enlarged elevation partially in section showing a lens mount and gate element constructed in accordance with my invention, parts of a projector being shown in section.

Fig. 3 is a view similar to Fig. 2 but with the parts in a different position.

Fig. 4 is a perspective view of parts of the objective mount and gate element used in connection with the objective shown in Figs. 2 and 3, a part of this view being shown in section.

Figure 1:
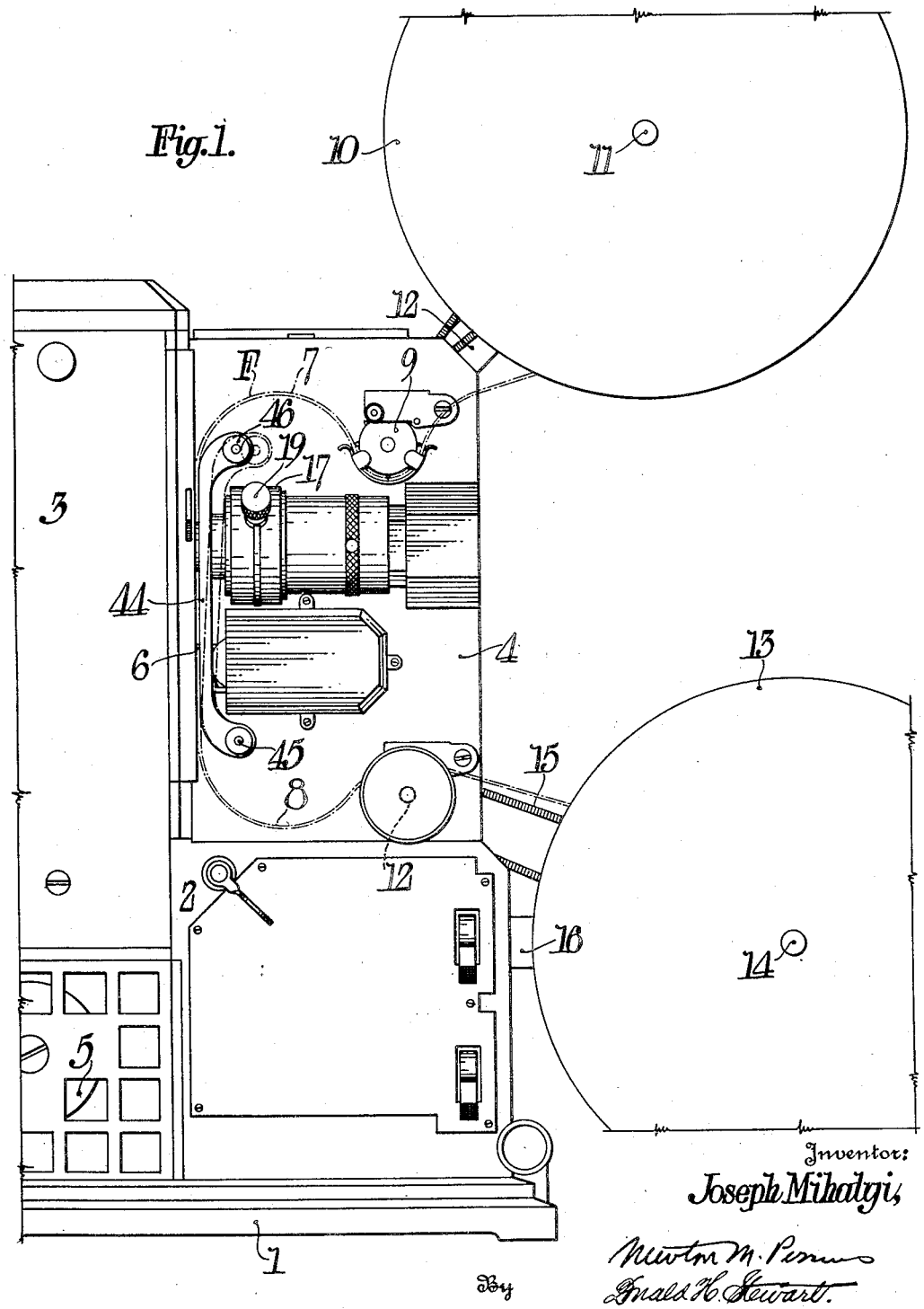
Fig. 1 is a side elevation of a motion picture projector equipped with an objective and gate element constructed in accordance with and embodying a preferred form of my invention.

It is well known that as the aperture of an objective increases it is increasingly difficult to produce a flat field, that is, a field such that objects lying in a plane will be sharply in focus. In cameras and particularly in projectors, it is very useful to have a lens of exceedingly wide aperture, and if the film is held in a curved position to correspond with the field of such an objective, first class results can be obtained.

Wide aperture objectives having a curved field of focus are considerably cheaper to manufacture than wide aperture objectives which are optically corrected so that the focal field of the objective is a flat plane. In the photographic arts and particularly the motion picture art, it is possible to compensate for such curvature of the focal field of the objective by curving the film, and such mechanical correction is much more economical to effect than optical correction of the objective.

Since the curvature of the field of focus may vary between objectives of the same apertures and particularly between objectives of different apertures, and since objectives for motion picture apparatus are often interchanged, I have provided on each objective, which has a curved field, a guide means for curving the film mechanically to compensate for the curvature of the lens field, and the guide means on each objective, upon interchange of objectives, will produce automatically an appropriate curvature in the film corresponding to the curvature of the field of focus of the substituted objective. The film guideway of the invention is capable of supporting the film in a flat plane in case fully corrected objectives are available, but said film guideway is also adapted to permit bending or curving of the film by a guide means on the objectives with curved fields.

While it is evident that my invention is equally suitable for cameras and projectors, by way of illustration I have shown in Fig. 1 a typical motion picture projector with which my improved objective can be used.

This projector may consist of a base 1 from which a housing 2 extends upwardly, supporting the lamphouse 3 and the film operating mechanism which is preferably enclosed in a housing 4.

The operating mechanism may be of any usual type preferably driven by power through a motor 5 and preferably consisting of a toothed film engaging member, such as the intermittently actuated pulldown claw 6 for intermittently moving a film F past a gate through which light may pass.

In the present instance the film F is looped at 7 and 8 on both sides of the film gate, the film being advanced to the loop 7 by means of a constantly rotated sprocket 9 which draws the film from a supply reel 10 mounted on a shaft 11 carried by an arm 12.

A sprocket similar to 9 is carried by the shaft 12 and moves the film continuously from the loop 8 so as to wind it upon a take-up reel 13 carried by a shaft 14 which is rotated by power through a suitable belt 15. The shaft 14 is supported by an arm 16.

As thus far described, the projector may be of any well-known type.

In the projector illustrated there is a lens support 17 in the form of an annular ring, best shown in Figs. 2 and 3. A set screw 18 passes through a threaded opening in this ring so that by adjusting the knurled head 19, an objective mount may be secured in the proper position relative to the film path.

As shown in Fig. 2, a typical objective mount may consist of a tubular member 20 having an accurately formed surface 21 adapted to slide into the annular member 17 until the flange 22 rests against the end of the annular member. The objective support is then located in position and fastened by turning the knurled head 19 until the set screw enters into a groove 23 which definitely secures the objective mount in place. In the form shown, the objective itself is carried by a barrel 24 which may be moved in and out of the tubular member 20 by a focusing ring 25 which can be operated by a handle 26 in any known manner. Thus, the objective can be moved to and from a film for focusing.

The objective mount also carries a rearwardly extending tubular member 27 which forms a part of the objective mount and which is moved with it to and from an operative position with respect to the motion picture apparatus. Member 27 is preferably annular in shape and is provided with two flanges 28 and 29 of somewhat less diameter than the major portion of this element. These flanges are for a purpose which will be hereinafter more fully described.

Slidably mounted in the annular member 27 is a second annular member 30 which has an outwardly extending flange 31 adapted to slide between the two flanges 28 and 29. However, the flange 31 is normally thrust by means of a spring 32 away from the tubular member 20 into the position shown in Fig. 2 in which the supplementary guide means 33, best shown in Fig. 4, is held in an operative position.

As will be seen from Fig. 4, the supplementary guide means 33 consists of a frame with a top member 34 and a similar bottom member of a size suitable to frame the film and raised side rails 35. These side rails are adapted to contact with a film F along unsupported edges 36 so that the film will be curved as indicated in Fig. 4. In this figure it will be noted that the film rests upon the runners 37 of the gate element 38 and since the rails 35 are not as wide as the runners 37, and since the rails 35 extend slightly into the opening 39 in the gate member 38, the film is held in a curved position as shown in this figure.

Since the supplementary guide means 33 carried by the objective is resiliently pressed rearwardly by the spring 32, a means is provided for definitely locating this movable gate section with respect to gate member 38 which is carried by the motion picture machine. To do this, a pair of pins 40 are carried by a flat surface 41 on the supplementary guide means 33 and these pins are accurately milled to the proper height to position the supplementary guide means 33 when this element is resiliently thrust against the gate element 38. Slots 42 in the surface 41 permit the film guiding flanges 43 carried by the movable film guide 44 to extend in beyond the rails 35. Thus the motion picture machine is provided with the usual two-part gate 38 and 44, and part 44 must be moved relatively to part 38 for threading the film through the machine. This gate will hold a film in a normal position when a normal objective is used. However, when an abnormal objective is used and is equipped with the supplementary gate element which consists of the member 33 carrying the film locating rails 35, the film will be moved from its normal position between gate members 38 and 44 to compensate for the field of the abnormal objective.

As indicated in Fig. 1, the movable film guide 44 may be hinged upon a hinge pintle 45 and may be held in an operative position by means of a movable plunger 46. By pulling out the plunger 46 and moving the movable guide 44 to the position shown in dot-dash lines in Fig. 1, the parts are separated to permit a film F to be threaded through the gate.

Fig. 2 illustrates the relative position between the gate sections when a film F is passing through the gate and illustrates how the rails 35 hold the film F in a curved position to correspond with the field of the objective used.

Fig. 3 illustrates the position of the same parts when the movable guide 44 has been swung to an inoperative position to permit a film F to be threaded past the gate member.

As is customary with motion picture apparatus, such as cameras or projectors, the most desirable objective can be selected and placed on the apparatus which I have described above without regard to the type of objective employed. If the objective is one having a normal aperture and a flat field, the objective will merely consist of the usual mount which can be held in the annular member 17 by the set screw 18 and which does not include the rearward extension 27 and the movably mounted supplementary guide means 33. In this case the film is solely positioned by means of the movable film guide 44 and the rear gate section 38 which is carried by the projection apparatus, and which together constitute a gate.

However, if an extremely wide aperture objective with a curved field is employed, the operator merely places the objective on the apparatus in exactly the same manner—that is, by placing the lens barrel 20 carrying the objective in the annular member 17 and by tightening the set screw 18. This operation automatically brings the resiliently mounted guide means 33 into a position in which it is adapted to contact with a film F carried by a gate member 38 of the motion picture apparatus, and in which it is in position to curve the film to the proper extent for the particular objective in place. Thus, for each objective having a curved field, a special type of supplementary guide means 33 is provided in which the rails 35 are so positioned and arranged that the film will be curved for the field of the particular lens employed.

An operator may therefore use any one of these objectives without having to make any adjustment whatsoever on the motion picture apparatus on which it is used. By providing a resilient gate section with a means for contacting with and curving a film so that it will lie in the field of the objective to which it is applied, I have produced an objective which would otherwise be discarded as unsuitable for use because of its curved field. I have also provided a unitary structure which permits lenses with curved fields to produce extremely high-class results in both taking and projecting.

While I have described my invention as applied to a motion picture projector, it is obvious that certain features of the invention are equally applicable to motion picture cameras and other photographic equipment, and I contemplate as within the scope of my invention all such apparatus as may come within the scope of the following claims.

What I claim is:

1. In a motion picture apparatus, the combination with a film guideway for supporting a film strip, including a stationary gate member having shoulder portions, and including a movable gate member provided with an opening, objective means including optical elements having a curved field of focus and including an objective casing, and a supporting means for detachably mounting said objective means on said apparatus with the objective focal field at said film guideway, of supplementary guide means on said objective casing for extending into said film guideway to engage the film therein and for co-operating with the shoulder portions of said stationary gate member to bend said film into the focal field of said objective.

2. In a motion picture apparatus, the combination with a film guideway for supporting a film strip, including a stationary gate member having shoulder portions, and including a movable gate member provided with an opening, objective means including optical elements having a curved field of focus and including an objective casing, and a supporting means for detachably mounting said objective means on said apparatus with the objective focal field at said film guideway, of supplementary guide members on said objective casing for extending into said film guideway and having film engaging surfaces for engaging the film strip in said guideway, and means for actuating said guide members to move the film strip toward the shoulder portions of said stationary gate member, said shoulder portions and said film engaging surfaces being formed so that said film strip is bent into the focal field of said objective.

3. In a motion picture apparatus, the combination with a film guideway for supporting a film strip, including a stationary gate member having shoulder portions, and including a movable gate member provided with an opening, objective means including optical elements having a curved field of focus and including an objective casing, and a supporting means for detachably mounting said objective means on said apparatus with the objective focal field at said film guideway, of supplementary guide members on said objective casing for extending into said film guideway and having film engaging surfaces for engaging the film strip in said guideway, and means for actuating said guide members to move the film strip toward the shoulder portions of said stationary gate member, said shoulder portions and said film engaging surfaces being formed so that said film strip is bent into the focal field of said objective, and spacing means between said stationary gate member and said objective casing for limiting the movement of said supplementary guide members toward said shoulder portions.

4. In a motion picture apparatus, the combination with a stationary gate member having film guiding surfaces and shoulder portions, a movable gate member provided with an opening and having film guiding surfaces parallel and opposite to said guiding surfaces on said stationary gate member, said gate members constituting a film guideway for supporting a film strip in a flat plane, objective means including optical elements having a curved field of focus and including an objective casing, and a supporting means for detachably mounting said objective means on said apparatus with the objective focal field within said film guideway, of supplementary guide means on said objective casing and including film engaging surfaces for extending into said film guideway to engage the film strip therein, and resilient means for actuating said film engaging surfaces to move said film strip against said shoulder portions of the stationary gate member, said film engaging surfaces being formed with such relation to the optical characteristics of the objective that the film strip, by such movement against said shoulder portions, is bent into the focal field of said objective.

5. In a motion picture apparatus, the combination with a stationary gate member having spaced parallel guiding surfaces for guiding the margins of a film strip, being provided with an offset portion between said guiding surfaces and which is opposite the central portion of said film strip, and having shoulder portions between the guiding surfaces and the offset portion, a movable gate member provided with an opening and having guiding surfaces for guiding the opposite margins of the film strip, said gate members constituting a film guideway for supporting the film strip in a flat plane, objective means including optical elements having a curved field of focus and including an objective casing, and a supporting means for detachably mounting said objective means with the objective focal field within said film guideway, of supplementary guide means on said objective casing and including film engaging surfaces for extending through the opening in said movable gate member to engage the film strip in said film guideway, and resilient means actuating said film engaging surfaces to move the film strip against said shoulder portions, said film engaging surfaces co-operating with said shoulder portions to curve said film strip transversely into the offset portion of said stationary gate member and into the focal field of said objective.

JOSEPH MIHALYI.